US009292281B2

(12) United States Patent
Balachandran

(10) Patent No.: US 9,292,281 B2
(45) Date of Patent: Mar. 22, 2016

(54) IDENTIFYING CODE THAT EXHIBITS IDEAL LOGGING BEHAVIOR

(71) Applicant: VMWARE, INC., Palo Alto, CA (US)

(72) Inventor: Vipin Balachandran, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/458,303

(22) Filed: Aug. 13, 2014

(65) Prior Publication Data

US 2015/0378724 A1 Dec. 31, 2015

(30) Foreign Application Priority Data

Jun. 27, 2014 (IN) .............................. 3143/CHE/2014

(51) Int. Cl.
*G06F 9/44* (2006.01)
*G06F 11/36* (2006.01)

(52) U.S. Cl.
CPC .............. *G06F 8/73* (2013.01); *G06F 11/3636* (2013.01)

(58) Field of Classification Search
None
See application file for complete search history.

(56) References Cited

U.S. PATENT DOCUMENTS

| 6,718,535 | B1 * | 4/2004 | Underwood | 717/101 |
| 8,245,203 | B2 * | 8/2012 | Becker | 717/140 |
| 8,578,340 | B1 * | 11/2013 | Daudel et al. | 717/129 |
| 2005/0015751 | A1 * | 1/2005 | Grassens | 717/130 |
| 2005/0065973 | A1 * | 3/2005 | Steensgaard et al. | 707/103 Y |
| 2006/0059146 | A1 * | 3/2006 | McAllister et al. | 707/6 |
| 2009/0049428 | A1 * | 2/2009 | Cozmei | 717/128 |
| 2011/0067008 | A1 * | 3/2011 | Srivastava et al. | 717/128 |
| 2011/0083123 | A1 * | 4/2011 | Lou et al. | 717/125 |
| 2011/0154300 | A1 * | 6/2011 | Rao et al. | 717/133 |
| 2011/0246826 | A1 * | 10/2011 | Hsieh et al. | 714/20 |
| 2011/0296244 | A1 * | 12/2011 | Fu et al. | 714/37 |
| 2012/0137181 | A1 * | 5/2012 | Thompson | 714/48 |
| 2014/0149576 | A1 * | 5/2014 | Pavlov et al. | 709/224 |
| 2014/0331092 | A1 * | 11/2014 | Taylor et al. | 714/48 |

OTHER PUBLICATIONS

Level (Apache Log4j 1.2.17 API), May 27, 2015, pp. 1-5.*
The log4j.properties file, May 27, 2015, pp. 1-2.*
Weihang Jiang, et al., "Understanding Customer Problem Troubleshooting From Storage System Logs", in Proceedings of the 7th USENIX Conference on File and Storage Technologies, ser. FAST '09. Berkeley, CA, USA: USENIX Association, 2009, pp. 43-56.

(Continued)

*Primary Examiner* — Isaac T Tecklu

(57) ABSTRACT

Techniques are described for identifying the ideal or preferred logging behavior to be followed in a software development project. A numerical weight is computed for each method in the source code that can be used to rank the logging behavior of that method. The numerical weight is computed in such a way that the methods whose log printing statements have been modified more frequently receive higher numerical weights. The assumption is that since most logging enhancements are done as after thoughts during code reviews or while fixing bugs, the ideal logging behavior will be exhibited by those methods whose logging behavior was modified the most frequently. Once the methods have been ranked according to the numerical weight, the highest ranking methods can be used to provide insight to developers about the ideal logging behavior for the project.

18 Claims, 5 Drawing Sheets

(56) References Cited

OTHER PUBLICATIONS

Ding Yuan, et al., "Characterizing Logging Practices in Open-Source Software", in Proceedings of the 2012 International Conference on Software Engineering, ser. ICSE 2012. Piscataway, NJ, USA: IEEE Press, 2012, 11 pages.

Ding Yuan, et al., "Improving Software Diagnosability Via Log Enhancement", in Proceedings of the sixteenth international conference on Architectural support for programming languages and operating systems, ser. ASPLOS XVI. New York, NY, USA: ACM, 2011, 12 pages.

Pamela Bhattacharya et al., "Graph-Based Analysis and Prediction for Software Evolution", in Proceedings of the 2012 International Conference on Software Engineering. IEEE Press, 2012, 11 pages.

Magiel Bruntink et al., "Discovering Faults in IDIOM-Based Exception Handling", in Proceedings the 28th International Conrence on Software Engineering, ser. ICSE '06. New York, NY, USA: ACM, 2006, 10 pages.

Thomas J. McCABE, "A Complexity Measure," IEEE Transactions on Software Engineering, vol. SE-2, No. 4, Dec. 1976, pp. 308-320.

\* cited by examiner

```
LOG-RANK(G, commits)
1   for each commit c ∈ commits
2       for each node m ∈ G
3           C_v[m] = 0; C_a[m] = 0; C_d[m] = 0
4       for each log printing statement change l ∈ c
5           m = l.method
6           if m ∉ G or IS-MOVED(l) or IS-NEW(m, c)
7               continue
8           if IS-VERBOSITY-CHANGED(l)
9               C_v[m] = C_v[m] + 1
10          else if IS-LOG-ADDED(l)
11              C_a[m] = C_a[m] + 1
12          else if IS-LOG-DELETED(l)
13              C_d[m] = C_d[m] + 1
14      for each node m ∈ G
15          lr_c = (W_v × C_v[m] + W_a × C_a[m] + W_d × C_d[m]) / m.eloc
16          w_lr = 1 / (1+BUG-PRIORITY(c))
17          lr[m] = lr[m] + w_lr × lr_c
18  return lr
```

FIG. 3

IDENTIFYING CODE THAT EXHIBITS IDEAL LOGGING BEHAVIOR

RELATED APPLICATIONS

Benefit is claimed under 35 U.S.C. 119(a)-(d) to Foreign application Serial No. 3143/CHE/2014 filed in India entitled "IDENTIFYING CODE THAT EXHIBITS IDEAL LOGGING BEHAVIOR", filed on Jun. 27, 2014, by VMware. Inc., which is herein incorporated in its entirety by reference for all purposes.

TECHNICAL FIELD

The present disclosure generally relates to software logging and tracing techniques and more particularly relates to identifying methods and functions in source code which exhibit ideal or preferred logging behavior.

BACKGROUND

When developing software, programmers usually add log statements to the source code, which later provide information about the execution of the program. This information is recorded in one or more log files during the execution of the program and can be viewed and/or analyzed using a number of tools. Log files are valuable data sources for debugging. The troubleshooting time of production failures is reduced when log files are available. In cases where it is difficult to reproduce production failures, logs are sometimes the only available resources to aid problem diagnosis. This is especially true for critical bugs which require fast resolution, and the time spent for reproducing such bugs should be minimized.

Currently, there is no accepted industry-wide standard for logging, and it is often done in an arbitrary manner. There exist a number of libraries which aid logging, but such log libraries offer little help in standardizing the logging practice. For example, software projects built using Java as the main programming language often use log 4j as the logging library.

Logging libraries frequently associate a verbosity level with each of the log printing statements. For example, log 4j has built-in verbosity levels such as TRACE, DEBUG, INFO, WARN, ERROR and FATAL; with the TRACE verbosity level being assigned the lowest rank, and FATAL being assigned the highest rank. The advantage of verbosity level is that the library can be configured to emit only a subset of log statements without recompiling the code or modifying the log printing statements. For example, if the root logger verbosity level in log 4j is set to INFO, only the log statements with verbosity level of INFO or above (i.e., ERROR and FATAL) are logged.

Due to the arbitrary nature of logging, new programmers in a project often find it difficult to understand the ideal logging behavior to be followed for the project. The logging behavior in this context refers to various aspects of logging including the density of log statements, verbosity level assignment, diagnostic context in the log messages, and the like. If not properly understood, improper logging behavior may lead to lack of log statements, less contextual data, unnecessary log statements and improper verbosity levels. The lack of log statements and less contextual data could make the production failure diagnosis difficult.

Developers are often confused about what to log. The decision may be simple in the case of error conditions or exceptions. But with other parts of the code, even guidelines offer little help. This results in missing or unnecessary log statements. When confused, developers tend to add more log printing statements than necessary since it is considered to be safer than missing vital data. But unnecessary log statements will result in fast roll-over of log files, thereby losing valuable diagnostic data. It also creates visual clutter, and can confuse the developer during debugging.

One problem with improper verbosity level assignment is that if the rank of a log statement's verbosity level is higher than it should be, it would create noise in the logs and result in fast rollover. If the rank is lesser than it should be, it won't be logged if the configured verbosity level for logging has a higher rank.

BRIEF DESCRIPTION OF THE DRAWINGS

FIG. 3 illustrates an example of an algorithm for identifying the log ranks of methods in the source code, in accordance with various embodiments;

DETAILED DESCRIPTION

Techniques in accordance with various embodiments of the present disclosure provide more efficient ways to identify methods which exhibit ideal or preferred logging behavior to be followed in a software development project. In particular, embodiments described herein compute a numerical weight for each method in the source code that can be used to rank the logging behavior of that method. The numerical weight is computed in such a way that the methods whose log printing statements have been modified more frequently will receive higher numerical weight. The assumption is that since most logging enhancements are done as after thoughts during code reviews or while fixing bugs, the ideal logging behavior will be exhibited by those methods whose logging behavior was modified the most frequently. Once the methods have been ranked according to the numerical weight, the highest ranking methods can be used to provide insight to developers about the ideal logging behavior for the project. The measure used to identify such methods will be referred to herein as the "log rank" of a method, wherein a high log rank of a method indicates that the method exhibits ideal or preferred logging behavior.

In various embodiments, the process for identifying methods which exhibit ideal logging behavior can begin by analyzing the source code of a software project. The source code normally contains many methods, with at least some subset of those methods containing log printing statements. The process can generate a call graph where the nodes of the graph represent the methods and the edges represent the function calls between those methods. The process can then traverse the call graph and assign to each method containing the one or more log printing statements, a numerical weight to indicate the log rank of each method. The numerical weight can be computed based at least in part on a frequency of modifications that were performed and committed on the log printing statements. For example, the methods whose log printing statements have been modified more frequently can receive higher numerical weight and conversely, the methods whose log printing statements have been modified less frequently or not at all, can receive lower numerical weights. In some embodiments, the numerical weight can also be based on the bug priority data associated with the modifications, which can be retrieved from the bug tracker of the source code. For example, if a modification to the log printing statements was made when fixing a high priority bug, it can be assumed that the modification more accurately reflects the ideal logging behavior for the project and thus, the numerical weight for the modified method can be increased.

Figure 1:
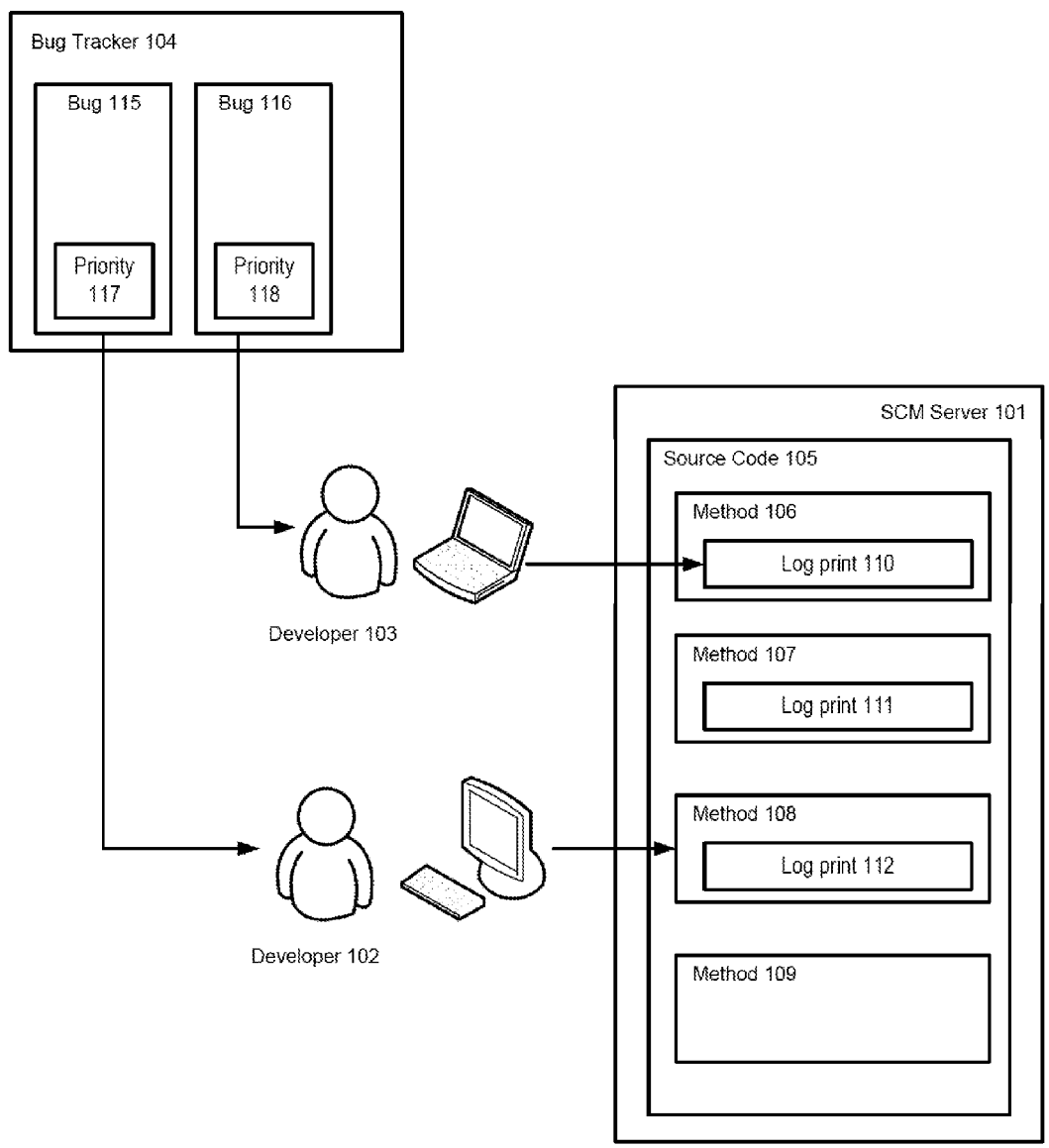
FIG. 1 illustrates an example of a source code development environment, in accordance with various embodiments.

FIG. 1 illustrates an example of a source code development environment, in accordance with various embodiments. As illustrated in this example, the Software Configuration Management (SCM) server 101 contains the source code of the software project being developed and numerous developers (102, 103) can be simultaneously working on the source code 105. The source code 105 contains large numbers of methods (106, 107, 108, 109), many of which end up containing log printing statements (110, 111, 112). The log printing statements typically write information (e.g., runtime execution information) to one or more log files. These log files can be analyzed in order to debug the application, identify issues, enhance performance and the like.

As previously mentioned, most logging enhancements are done as afterthoughts, either during code reviews or during the process of fixing bugs (115, 116). The average churn rate of logging code is almost twice when compared to the entire code. While fixing bugs, developers (102, 103) analyze log files in detail, identify various logging issues and add/update/delete log printing statements (e.g., 110, 111, 112). For example, as shown in this illustration, developer 103 may be tasked with fixing bug 116 and during the process of fixing the bug 116, developer 103 modifies the log printing statement 110 of method 106. Similarly, developer 102 may be tasked with fixing bug 115 and in the process of fixing the bug, developer 102 may modify method 108 without modifying its log printing statement.

When developers modify the log printing statements, this enhanced logging code often provides insights into best logging practice that should be followed for the entire project. Intuitively, if a method's log printing statements have been modified many times, its logging behavior could be considered highly refined, and can serve as a good example of ideal logging behavior that should be followed for the project. Based on this postulation, this application proposes a log ranking metric (LogRank) to quantify the logging behavior of a method. A high value of LogRank implies an ideal logging behavior.

LogRank assigns a numerical weight to each of the methods in the source code in such a way that the methods whose logging behavior has been frequently modified as afterthoughts will get a higher numerical weight. Developers can then look into methods of high LogRank to identify the ideal logging behavior. LogRank can be computed by analyzing the commit and bug history of the source code 105. Once a number of changes to the source code have been committed, the log printing statement changes in each of the commits are analyzed and scores are assigned to associated methods.

In most cases, the project utilizes a bug tracker 104 system. The bug tracker 104 maintains a list of all bugs that have been identified or reported. Each bug typically is associated with a priority (117, 118) that indicates the severity of the bug. For example, a bug that significantly affects the most important functionality of the code will typically be given a high priority, while a latent bug that only slightly affects system functionality may be assigned a lower priority.

It has been observed that while fixing a high priority bug, extra care is usually exercised by the developer in the code change. Therefore, log enhancements made during a commit that involves fixing a high priority bug can be considered highly refined when compared to the log changes in other commits. Therefore, priority of the bug fixed by the commit, if any, can also be factored in while assigning the log ranking score.

Figure 2:
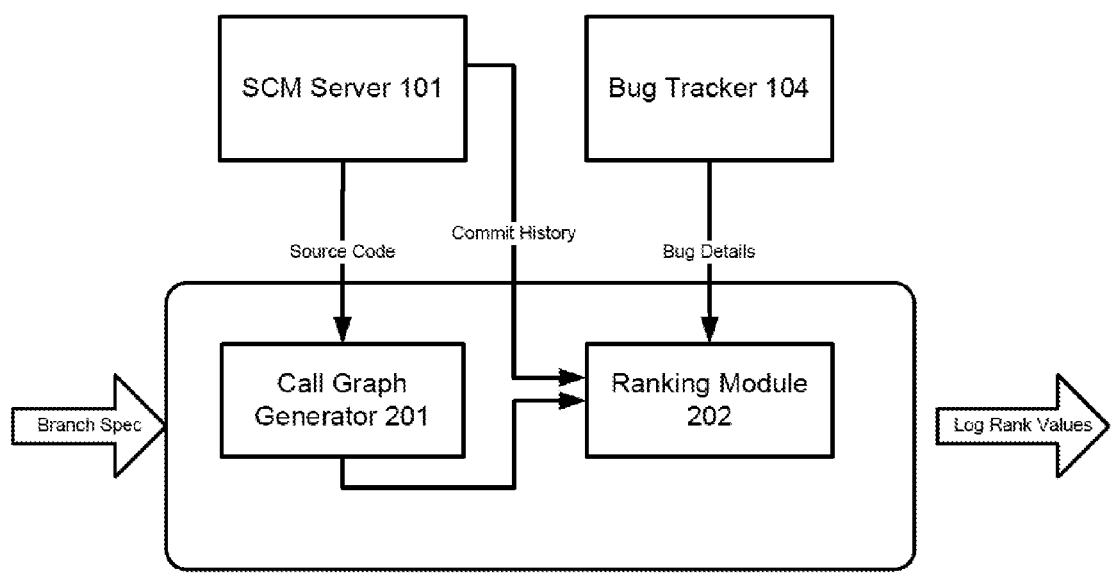
FIG. 2 illustrates an example of a system for identifying the methods that exhibit ideal logging behavior, in accordance with various embodiments.

FIG. 2 illustrates an example of a system for identifying the methods that exhibit ideal logging behavior, in accordance with various embodiments. This overview of LogRank computation uses a call graph of the source code to represent the methods. However, it should be noted that not all embodiments described herein are limited to the use of a call graph and in many alternative embodiments, a different data structure (e.g., tree, linked list, etc.) or a text file may be utilized. In this example, the LogRank function is carried out by ranking module 202. The input to LogRank function is the branch spec, which contains branch name and connection parameters of the Software Configuration Management (SCM) server 101 from where the project source code can be downloaded. The call graph generator module 201 generates static call graph of the source code, which serves as one of the inputs to the ranking module 202. The ranking module 202 assigns numerical weights to various nodes (methods) in the call graph based on historical logging enhancements (fetched from SCM server 101) and bug priority data (fetched from bug tracker 104).

In the illustrated embodiment, a static call graph is a directed graph where nodes represent methods/functions and edges represent function calls. In this implementation, if a method A calls another method B, then there will be a directed edge from the node representing method A to the node representing method B. The call graph generator 201 analyzes the source code, and generates its static call graph for further analysis.

To compute LogRank, the ranking module 202 considers the changes in log printing statements in the commit history. The changes that are considered include verbosity level changes and addition or deletion of log printing statements. In one embodiment, changes in static content of log messages, addition or deletion of contextual data, renaming of variables constituting the contextual data, renaming of log printing function names and verbosity levels etc. are ignored. This is because such changes might have been made to keep the logging behavior consistent with changes in logic. In the same way, moving log printing statements from one place to another within the same method can be ignored, and not considered as deletion and addition of a log printing statement. Log printing statements in a newly introduced method may also be ignored, since there are no afterthoughts involved there. It should be noted, however, that ignoring certain changes mentioned above should in no way be considered as required to the embodiments described herein.

FIG. 3 illustrates an example of an algorithm for identifying the log ranks of methods in the source code, in accordance with various embodiments. It should be noted that the terms "log rank" and "LogRank" are sometimes used interchangeably throughout this application and it is intended that the term "log rank" corresponds to the metric "LogRank" illustrated in the figures. As shown in this illustration, the for loop in line 1 iterates over each of the commits and updates the LogRank of each of the methods in the call graph G. The counts of verbosity level changes ($C_v$), log statement additions ($C_a$), and deletions ($C_d$) in each of the methods in G, corresponding to the current commit c are initialized in line 3. The for loop in line 4 iterates over each of the log printing statement changes in the commit and updates the count. If the method m corresponding to the log printing statement change l cannot be found in G (e.g., method might have been deleted, moved or renamed), further processing is skipped (line 6). The change l is also skipped if it is found that it is due to the movement of a log statement within the same method (checked using IS-MOVED in line 6) or m is a new method introduced in commit c (checked using IS-NEW). The various counts are incremented using the "if" and "else if" statements in line 8, depending on the type of change. The count $C_v[m]$ is incremented if the log printing statement change l in method m corresponds to a verbosity level change (checked using IS-VERBOSITY-CHANGED in line 8). Similarly the counts $C_a[m]$ or $C_d[m]$ are incremented based on checks IS-LOG-ADDED (line 10) and IS-LOG-DELETED (line 12), which returns TRUE if the change l corresponds to log addition or log deletion respectively.

The for loop in line 14 updates the LogRank values of each of the methods based on log printing statement changes in commit c. To update the LogRank, the normalized weighted sum of counts of different types of log changes in the method (caused by the commit) is computed first (line 15). The weights ($W_v$, $W_a$ and $W_d$) are configurable and determine the importance of a particular type of log printing statement change in defining the ideal logging behavior. The normalization is done using the count of executable lines of code in the method. If the commit is made to address a high priority bug, it can be assumed that the logging behavior has been thoroughly analyzed. Therefore, such commits should add more weight to the LogRank. The weight caused by the bug associated with the commit is computed in line 16. Here we assume that the bug priorities are in the range [0 . . . 4], with 0 representing the highest priority and 4, the lowest priority. If the commit does not correspond to a bug fix, the priority is taken as 5. After processing all the commits, LogRank values are returned in line 18.

Figure 4:
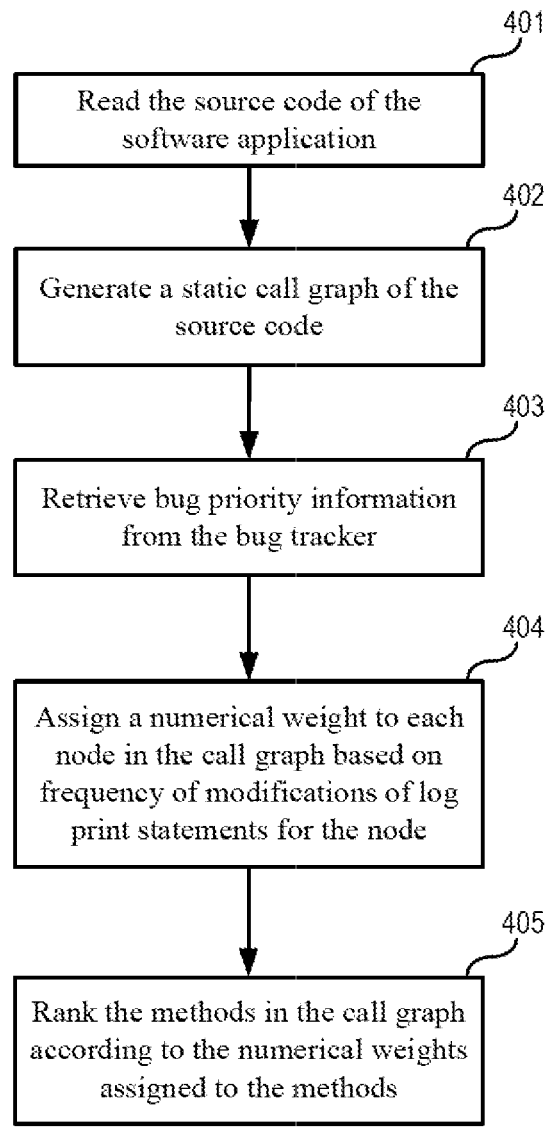
FIG. 4 illustrates another example of a process flow for identifying the methods which exhibit ideal logging behavior, in accordance with various embodiments.

FIG. 4 illustrates another example of a process flow for identifying the methods that exhibit ideal logging behavior, in accordance with various embodiments. As shown in operation 401, the call graph generator reads the source code of the software application, which can be obtained from an SCM server. In operation 402, a static call graph is generated for the source code. The static call graph represents each method in the source code as a node in the graph and each function call between the methods are represented by the edges between the nodes.

In operation 403, the ranking module obtains bug priority information from the bug tracker. The ranking module also obtains the commit history of the code changes from the SCM server. In operation 404, the ranking module assigns a numerical weight to each node in the call graph. The numerical weight is used to determine the log rank of said each method. The numerical weight can be computed based at least in part on a frequency of modifications performed on the one or more log printing statements, as well as the priority information of the bug that triggered the code change commit. For example, methods whose log printing statements have been modified more frequently receive higher numerical weights and conversely, methods whose log printing statements have been modified less frequently or have not been modified, receive lower numerical weights. The numerical weight is also based on the bug priority data associated with the modifications. For example, if a modification to the log printing statements was made when fixing a high priority bug, it can be assumed that the modification more accurately reflects the ideal logging behavior for the project and thus, the numerical weight for the modified method can be increased.

In operation 405, the ranking module ranks all the methods in the call graph according to the numerical weights assigned to the methods. The highest ranking methods can then be displayed to the developers, as indicating the ideal logging behavior. Programmers can inspect methods of high LogRank value to identify the ideal logging behavior to be followed for the project.

Figure 5:
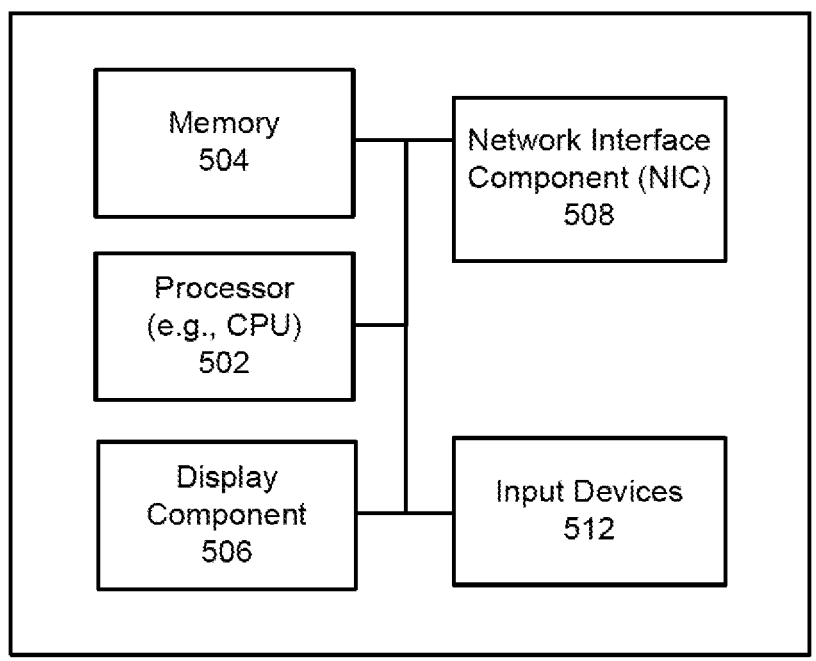
FIG. 5 illustrates an example of some general components of a computing device, in accordance with various embodiments.

FIG. 5 illustrates an example of some general components of a computing device, in accordance with various embodiments. In this particular example, the device includes one or more processors (e.g., central processing units (CPUs) 502 for executing instructions that can be stored in physical memory component 504. The memory component 504 can include many types of memory, data storage, or non-transitory computer-readable storage media, such as random access memory (RAM) storing program instructions for execution by the processor 502, a separate form of storage for images or data, a removable memory for sharing information with other devices and the like. The computing device typically can further comprise a display component 506, such as a monitor, a touch screen, liquid crystal display (LCD), or the like. In various embodiments, the computing device will include at least one input device 512 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 508 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for identifying methods which exhibit ideal logging behavior in source code, said method comprising:
under control of one or more computer systems configured with executable instructions,
processing the source code of a computer program to identify a plurality of methods that contain one or more log printing statements;
processing a commit history of the source code to identify a frequency of modifications performed on the one or more log printing statements for each of the plurality of methods;
storing each of the plurality of methods into a static call graph in memory of the one or more computing systems, wherein each node of the static call graph represents a method and each edge between nodes in the static call graph represents a function call;
assigning, to each node of the static call graph a numerical weight to indicate a log rank of the method resented by the node, the numerical weight computed based at least in part on the frequency of modifications performed on the one or more log printing statements; and
ranking the nodes of the static call graph according to the numerical weight indicating the log rank; and
displaying the method represented by the node having the highest numerical weight on a display device, wherein processing the commit history further comprises restricting the frequency of modifications used to compute the numerical weight to only changes that include verbosity level changes, and addition and deletion of log printing statements.

2. The method of claim 1, wherein the numerical weight is based on the frequency of modifications and bug priority data associated with one or more modifications committed to the source code.

3. The method of claim 1, wherein the modifications performed on the one or more log printing statements include at least one of: a verbosity level change, an addition of a log printing statement, or a deletion of a log printing statement.

4. The method of claim 3, wherein the verbosity level includes at least one of: TRACE, DEBUG, INFO, WARN, ERROR and FATAL.

5. The method of claim 1, further comprising:
determining a highest ranking method based on ranking the methods according to the numerical weight; and
displaying the highest ranking method with an indication that the highest ranking method exhibits an ideal logging behavior for the source code of the computer program.

6. The method of claim 1, wherein the numerical weight is computed such that an increase in the frequency of modifications to the one or more log printing statements of a method causes an increase in the numerical weight for said method.

7. A computing device, comprising:
at least one processor; and
memory including instructions that, when executed by the at least one processor, cause the computing device to:
process the source code of a computer program to identify a plurality of methods that contain one or more log printing statements;
process a commit history of the source code to identify a frequency of modifications performed on the one or more log printing statements for each of the plurality of methods;
store each of the plurality of methods into a static call graph in the memory, wherein each node of the static call graph represents a method and each edge between nodes in the static call graph represents a function call;
assign, to each node of the static call graph a numerical weight to indicate a log rank of the method represented by the node, the numerical weight computed based at least in part on a frequency of modifications performed on the one or more log printing statements; and rank the nodes of the static call graph according to the numerical weight indicating the log rank; and display the method represented by the node having the highest numerical weight on a display device, wherein processing the commit history further comprises restricting the frequency of modifications used to compute the numerical weight to only changes that include verbosity level changes, and addition and deletion of log printing statements.

8. The computing device of claim 7, wherein the numerical weight is based on the frequency of modifications and bug priority data associated with one or more modifications committed to the source code.

9. The computing device of claim 7, wherein the modifications performed on the one or more log printing statements include at least one of: a verbosity level change, an addition of a log printing statement, or a deletion of a log printing statement.

10. The computing device of claim 9, wherein the verbosity level includes at least one of: TRACE, DEBUG, INFO, WARN, ERROR and FATAL.

11. The computing device of claim 7, wherein the memory further comprises instructions that when executed by the at least one processor, cause the computing device to:

determine a highest ranking method based on ranking the methods according to the numerical weight; and display the highest ranking method with an indication that the highest ranking method exhibits an ideal logging behavior for the source code of the computer program.

12. The computing device of claim 7, wherein the numerical weight is computed such that an increase in the frequency of modifications to the one or more log printing statements of a method causes an increase in the numerical weight for said method.

13. A non-transitory computer readable storage medium comprising one or more sequences of instructions, the instructions when executed by one or more processors causing the one or more processors to execute the operations of:

processing the source code of a computer program to identify a plurality of methods that contain one or more log printing statements;

processing a commit history of the source code to identify a frequency of modifications performed on the one or more log printing statements for each of the plurality of methods;

storing each of the plurality of methods into a static call graph in the non-transitory computer readable storage medium, wherein each node of the static call graph represents a method and each edge between nodes in the static call graph represents a function call;

assigning, to each node of the static call graph a numerical weight to indicate a log rank of the method represented by the node, the numerical weight computed based at least in part on a frequency of modifications performed on the one or more log printing statements; and ranking the nodes of the static call graph according to the numerical weight indicating the log rank; and displaying the method represented by the node having the highest numerical weight on a display device, wherein processing the commit history further comprises restricting the frequency of modifications used to compute the numerical weight to only changes that include verbosity level changes, and addition and deletion of log printing statements.

14. The non-transitory computer readable storage medium of claim 13, wherein the numerical weight is based on the frequency of modifications and bug priority data associated with one or more modifications committed to the source code.

15. The non-transitory computer readable storage medium of claim 13, wherein the modifications performed on the one or more log printing statements include at least one of: a verbosity level change, an addition of a log printing statement, or a deletion of a log printing statement.

16. The non-transitory computer readable storage medium of claim 15, wherein the verbosity level includes at least one of: TRACE, DEBUG, INFO, WARN, ERROR and FATAL.

17. The non-transitory computer readable storage medium of claim 13, further comprising instructions to execute the operations of:

determining a highest ranking method based on ranking the methods according to the numerical weight; and displaying the highest ranking method with an indication that the highest ranking method exhibits an ideal logging behavior for the source code of the computer program.

18. The non-transitory computer readable storage medium of claim 13, wherein the numerical weight is computed such that an increase in the frequency of modifications to the one or more log printing statements of a method causes an increase in the numerical weight for said method.

* * * * *